United States Patent
Roter et al.

(10) Patent No.: US 9,659,176 B1
(45) Date of Patent: May 23, 2017

(54) SYSTEMS AND METHODS FOR GENERATING REPAIR SCRIPTS THAT FACILITATE REMEDIATION OF MALWARE SIDE-EFFECTS

(71) Applicant: Symantec Corporation, Mountain View, CA (US)

(72) Inventors: Michele Roter, Palm Desert, CA (US); Chester Kuei, Anaheim, CA (US)

(73) Assignee: Symantec Corporation, Mountain View, CA (US)

( * ) Notice: Subject to any disclaimer, the term of this patent is extended or adjusted under 35 U.S.C. 154(b) by 21 days.

(21) Appl. No.: 14/334,391

(22) Filed: Jul. 17, 2014

(51) Int. Cl.
*G06F 11/00* (2006.01)
*G06F 21/56* (2013.01)

(52) U.S. Cl.
CPC .......... *G06F 21/568* (2013.01); *G06F 21/562* (2013.01)

(58) Field of Classification Search
CPC ............. H04L 63/1416; H04L 63/1408; H04L 63/1441; H04L 63/1458; H04L 63/145; G06F 21/552; G06F 21/562
USPC .......................................................... 726/23
See application file for complete search history.

(56) References Cited

U.S. PATENT DOCUMENTS

| | | | |
|---|---|---|---|
| 7,287,279 B2 * | 10/2007 | Bertman | G06F 21/563 382/103 |
| 7,496,963 B2 * | 2/2009 | Shipp | 726/24 |
| 7,685,638 B1 * | 3/2010 | Buches | 726/22 |
| 7,934,229 B1 * | 4/2011 | Vogel | G06F 21/568 725/24 |
| 8,250,655 B1 * | 8/2012 | Malanov et al. | 726/24 |
| 8,667,583 B2 * | 3/2014 | Polyakov | G06F 21/552 726/22 |
| 8,739,283 B1 * | 5/2014 | Zhang et al. | 726/24 |
| 8,776,229 B1 * | 7/2014 | Aziz | H04L 63/1425 713/176 |
| 8,850,579 B1 * | 9/2014 | Kalinichenko | 726/23 |
| 8,898,788 B1 * | 11/2014 | Aziz | G06F 21/00 726/23 |
| 8,904,536 B2 * | 12/2014 | Breitenbacher | 726/24 |
| 9,088,606 B2 * | 7/2015 | Ranum et al. | |
| 9,165,142 B1 * | 10/2015 | Sanders | G06F 21/566 |

(Continued)

OTHER PUBLICATIONS

File names and file name extensions frequently asked questions—Windows Help http://windows.microsoft.com/en-us/windows/file-names-extensions-faq#1TC=windows-7 (May 10, 2014).*

(Continued)

*Primary Examiner* — Ali Abyaneh
(74) *Attorney, Agent, or Firm* — FisherBroyles LLP

(57) ABSTRACT

The disclosed computer-implemented method for generating repair scripts that facilitate remediation of malware side-effects may include (1) identifying a potentially malicious file located on a computing system, (2) determining at least one potential side-effect of the potentially malicious file, (3) generating, based at least in part on the potential side-effect of the potentially malicious file, a repair script that facilitates remediation of the potential side-effect, and then (4) remedying the potential side-effect by directing the computing system to execute the repair script. Various other methods, systems, and computer-readable media are also disclosed.

20 Claims, 8 Drawing Sheets

(56) References Cited

U.S. PATENT DOCUMENTS

| | | | |
|---|---|---|---|
| 2005/0262567 A1* | 11/2005 | Carmona | G06F 21/564 726/24 |
| 2006/0179484 A1* | 8/2006 | Scrimsher | G06F 21/568 726/23 |
| 2006/0236392 A1* | 10/2006 | Thomas et al. | 726/23 |
| 2007/0240217 A1* | 10/2007 | Tuvell et al. | 726/24 |
| 2007/0289019 A1* | 12/2007 | Lowrey | 726/24 |
| 2012/0304244 A1* | 11/2012 | Xie | G06F 21/00 726/1 |
| 2013/0167236 A1* | 6/2013 | Sick | G06F 21/552 726/24 |
| 2013/0232576 A1* | 9/2013 | Karnikis et al. | 726/24 |
| 2013/0247193 A1* | 9/2013 | Zaitsev | 726/23 |
| 2014/0090061 A1* | 3/2014 | Avasarala et al. | 726/24 |
| 2014/0165203 A1* | 6/2014 | Friedrichs | G06F 21/56 726/24 |
| 2014/0208426 A1* | 7/2014 | Natarajan et al. | 726/23 |

OTHER PUBLICATIONS

"Backdoor.Tidserv", http://www.symantec.com/security_response/writeup.jsp?docid=2008-091809-0911-99, as accessed Jun. 4, 2014, Symantec Corporation, (Sep. 18, 2008).

"Trojan.Zeroaccess", http://www.symantec.com/security_response/writeup.jsp?docid=2011-071314-0410-99, as accessed Jun. 5, 2014, Symantec Corporation, (Jul. 13, 2011).

* cited by examiner

```
                            Known Side-Effects
                                   400

------------------------------------------------------------------------
**********************************************

FILES POTENTIALLY CREATED BY POTENTIALLY MALICIOUS FILE 210:
        %System%\drivers\TDSServ.sys
        %System%\drivers\H8SRTd.sys
        %System%\TDSS83984.dat
        %System%\TDSS37298.log
        %System%\TDSS48299.dll FILES POTENTIALLY MODIFIED BY POTENTIALLY MALICIOUS FILE 210:
        ndis.sys
        nvata.sys
        atapi.sys
        advapi32.dll
        idechndr.sys
        vmscsi.sys
        astor.sys REGISTRY KEYS POTENTIALLY CREATED BY POTENTIALLY MALICIOUS FILE 210:
        HKEY_CURRENT_USER\Software\Mozilla\affid=
        HKEY_CURRENT_USER\Software\Mozilla\subid=
        HKEY_LOCAL_MACHINE\SOFTWARE\H8SRT\injectors
        HKEY_LOCAL_MACHINE\SOFTWARE\H8SRT
        HKEY_LOCAL_MACHINE\SOFTWARE\TDSS
        HKEY_LOCAL_MACHINE\SYSTEM\CurrentControlSet\Services\H8SRTd.sys
        HKEY_LOCAL_MACHINE\SYSTEM\CurrentControlSet\Services\TDSServ
        HKEY_LOCAL_MACHINE\SYSTEM\CurrentControlSet\Control\SafeBoot\Network\TDSServ.sys
        HKEY_LOCAL_MACHINE\SYSTEM\CurrentControlSet\Control\SafeBoot\Minimal\TDSServ.sys

SYSTEMS AND METHODS FOR GENERATING REPAIR SCRIPTS THAT FACILITATE REMEDIATION OF MALWARE SIDE-EFFECTS

BACKGROUND

Malware often causes side-effects in infected computing devices. For example, a variant of a malware family may infect a computing device. Upon execution by the infected computing device, this variant may create or modify a component (such as a file or registry key) of the infected computing device. The name given to this component may depend on which variant of the malware family has infected the computing device. Accordingly, one variant may give one name to the component while another variant may give another name to the component.

Unfortunately, conventional remediation technologies may apply repair scripts that are only able to remedy malware side-effects corresponding to components with specific known names. For example, a remediation analyst may prepare a repair script designed to remedy malware side-effects caused by a specific variant of a malware family. These malware side-effects may correspond to components whose names were created or modified by the variant. In the event that another variant of the malware family gives slightly different names to these components, the repair script may be unable to remedy certain side-effects caused by this other variant.

The instant disclosure, therefore, identifies and addresses a need for improved systems and methods for generating repair scripts that facilitate remediation of malware side-effects.

SUMMARY

As will be described in greater detail below, the instant disclosure describes various systems and methods for generating repair scripts that facilitate remediation of malware side-effects by analyzing the side-effects caused by different variants of a malware family.

In one example, a computer-implemented method for generating repair scripts that facilitate remediation of malware side-effects may include (1) identifying a potentially malicious file located on a computing system, (2) determining at least one potential side-effect of the potentially malicious file, (3) generating, based at least in part on the potential side-effect of the potentially malicious file, a repair script that facilitates remediation of the potential side-effect, and then (4) remedying the potential side-effect by directing the computing system to execute the repair script.

In one embodiment, the potential side-effect of the potentially malicious file may include (1) a modification to a file name caused by the potentially malicious file, (2) a modification to a registry key caused by the potentially malicious file, (3) a creation of a file caused by the potentially malicious file, and/or (4) a creation of a registry key caused by the potentially malicious file.

In some examples, the method may also include executing the potentially malicious file in a controlled automation environment. In such examples, the method may further include detecting evidence of the potential side-effect upon executing the potentially malicious file. Additionally or alternatively, the method may include determining that the potentially malicious file causes the potential side-effect based at least in part on the evidence of the potential side-effect.

In some examples, the method may also include collecting behavioral information about the potentially malicious file from a group of computing devices that have executed the potentially malicious file. In such examples, the method may further include identifying the potential side-effect of the potentially malicious file by analyzing the behavioral information collected from the group of computing devices.

In some examples, the method may also include determining at least one potential side-effect of at least one variant of the potentially malicious file. In such examples, the method may further include generating a repair script that facilitates remediation of the potential side-effect of the variant.

In one embodiment, the variant of the potentially malicious file may include (1) a variant whose file name differs from a file name of the potentially malicious file and/or (2) a variant whose attribute differs from a corresponding attribute of the potentially malicious file.

In some examples, the method may also include determining potential side-effects of a family of malware. In such examples, the method may further include generating a repair script that facilitates remediation of the potential side-effects of the family of malware.

In some examples, the method may also include generating a generic repair script that (1) identifies a component of the computing system as potentially being a side-effect of the potentially malicious file and (2) facilitates remediation of the component identified as potentially being a side-effect of the potentially malicious file. In such examples, the method may further include computing a heuristic distance from a known side-effect of the potentially malicious file to the component identified as potentially being a side-effect of the potentially malicious file. Additionally or alternatively, the method may include determining that the heuristic distance from the known side-effect to the component is below a certain threshold. Finally, the method may include classifying the component as a side-effect of the potentially malicious file and then remedying the component due at least in part to the classification as a side-effect of the potentially malicious file.

In some examples, the method may also include executing at least one variant of the potentially malicious file in a controlled automation environment. In such examples, the method may further include detecting evidence suggesting that the component is a side-effect of the potentially malicious file upon executing the variant of the potentially malicious file. Additionally or alternatively, the method may include computing the certain threshold based at least in part on the evidence suggesting that the component is a side-effect of the potentially malicious file.

Additionally or alternatively, the method may also include collecting behavioral information from a group of computing devices that have executed the potentially malicious file. In such examples, the method may further include identifying the component as potentially being a side-effect of the potentially malicious file by analyzing the behavioral information collected from the group of computing devices. Finally, the method may include computing the certain threshold based at least in part on the component potentially being a side-effect of the potentially malicious file.

In one example, a system for implementing the above-described method may include (1) an identification module, stored in memory, that identifies a potentially malicious file located on a computing system, (2) a determination module, stored in memory, that determines at least one potential side-effect of the potentially malicious file, (3) a generation module, stored in memory, that generates, based at least in part on the potential side-effect of the potentially malicious file, a repair script that facilitates remediation of the potential side-effect, (4) a remediation module, stored in memory, that remedies the potential side-effect by directing the computing system to execute the repair script, and (5) at least one processor configured to execute the identification module, the determination module, the generation module, and the remediation module.

In some examples, the above-described method may be encoded as computer-readable instructions on a non-transitory computer-readable medium. For example, a non-transitory computer-readable medium may include one or more computer-executable instructions that, when executed by at least one processor of a computing device, may cause the computing device to (1) identify a potentially malicious file located on a computing system, (2) determine at least one potential side-effect of the potentially malicious file, (3) generate, based at least in part on the potential side-effect of the potentially malicious file, a repair script that facilitates remediation of the potential side-effect, and then (4) remedy the potential side-effect by directing the computing system to execute the repair script.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of an exemplary list of known malware side-effects.

Figure 1:
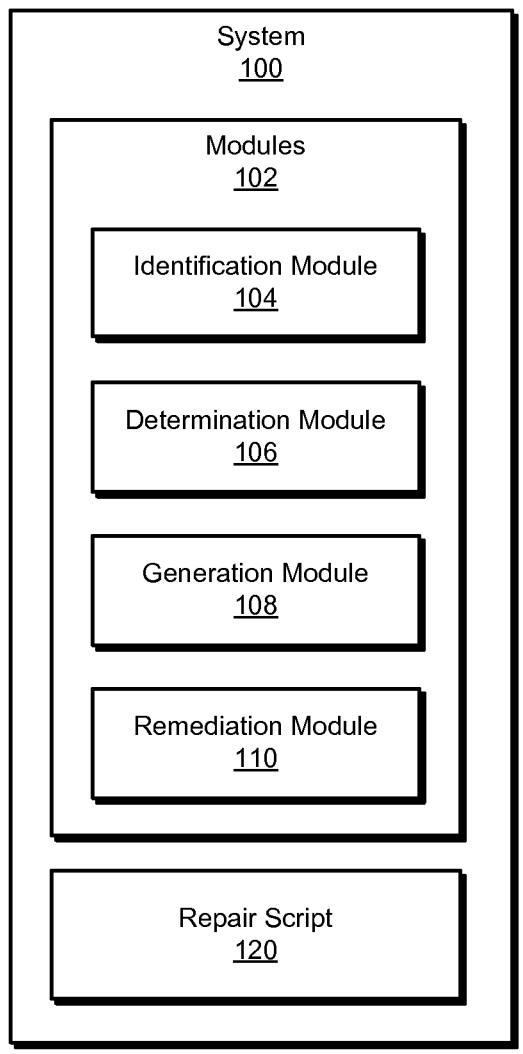
FIG. 1 is a block diagram of an exemplary system for generating repair scripts that facilitate remediation of malware side-effects.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating repair scripts that facilitate remediation of malware side-effects. As will be explained in greater detail below, by executing a potentially malicious file in a controlled automation environment, the various systems and methods described herein may monitor the behavior of the potentially malicious file. While monitoring the potentially malicious file's behavior, the various systems and methods described herein may detect evidence of a potential side-effect of the potentially malicious file. These systems and methods may then determine that the potentially malicious file likely causes the potential side-effect based at least in part on the evidence detected while monitoring the potentially malicious file's behavior.

Additionally or alternatively, by collecting field telemetry information from a group of computing devices that have executed the potentially malicious file, the various systems and methods described herein may extrapolate and/or analyze the potentially malicious file's behavior based at least in part on the field telemetry information. By extrapolating and/or analyzing the potentially malicious file's behavior, the various systems and methods described herein may determine that the potentially malicious file likely causes the potential side-effect.

Figure 2:
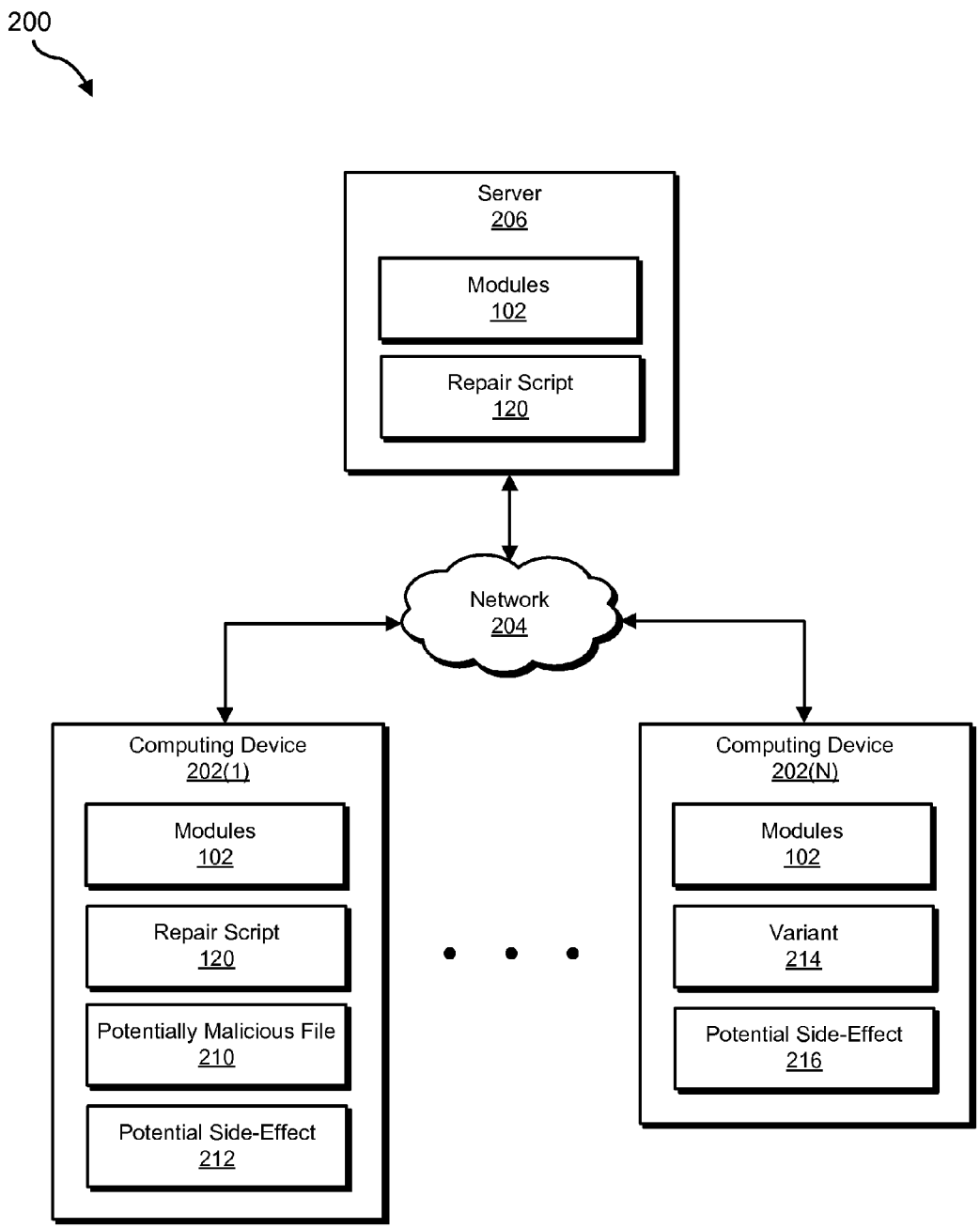
FIG. 2 is a block diagram of an additional exemplary system for generating repair scripts that facilitate remediation of malware side-effects.

The following will provide, with reference to FIGS. 1-2, detailed descriptions of exemplary systems for generating repair scripts that facilitate remediation of malware side-effects. Detailed descriptions of corresponding computer-implemented methods will be provided in connection with FIG. 3. Detailed descriptions of an exemplary list of known malware side-effects will be provided in connection with FIG. 4. Detailed descriptions of an exemplary component that is potentially a malware side-effect will be provided in connection with FIG. 5. Detailed descriptions of an exemplary heuristic for estimating whether a component is likely a malware side-effect will be provided in connection with FIG. 6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for generating repair scripts that facilitate remediation of malware side-effects. As illustrated in this figure, exemplary system 100 may include one or more modules 102 for performing one or more tasks. For example, and as will be explained in greater detail below, exemplary system 100 may also include an identification module 104 that identifies a potentially malicious file located on a computing system. Exemplary system 100 may also include a determination module 106 that determines at least one potential side-effect of the potentially malicious file.

In addition, and as will be described in greater detail below, exemplary system 100 may include a generation module 108 that generates, based at least in part on the potential side-effect of the potentially malicious file, a repair script that facilitates remediation of the potential side-effect. Exemplary system 100 may further include a remediation module 110 that remedies the potential side-effect by directing the computing system to execute the repair script.

Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more repair scripts, such as repair script 120. The term "repair script," as used herein, generally refers to any type or form of script, file, and/or executable that facilitates remediation of potential malware side-effects. In one example, repair script 120 may rely on one or more heuristics and/or probabilistic thresholds to estimate whether a component of a computing device is likely a malware side-effect. In this example, repair script 120 may be able to detect exact matches and/or approximate matches of malware side-effects. Accordingly, repair script 120 may represent a generic repair script that is able to remedy certain unknown malware side-effects.

In one example, repair script 120 may correspond to a specific family of malware. For example, repair script 120 may be designed to detect exact matches and/or approximate matches of side-effects caused by any variant of a malware family. Additionally or alternatively, repair script 120 may be designed to detect exact matches and/or approximate matches of side-effects caused by a specific variant of a malware family.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. In one example, computing device 202(1) may be programmed with one or more of modules 102. In this example, computing device 202(1) may obtain and/or generate repair script 120.

Additionally and/or alternatively, computing device 202(1) may store and/or include a potentially malicious file 210. The term "potentially malicious file," as used herein, generally refers to any type or form of script, file, and/or executable that potentially represents and/or includes malware. In one example, potentially malicious file 210 may represent and/or include a variant of a malware family. Examples of potentially malicious file 210 include, without limitation, computer viruses, computer worms, Trojan horses, spyware, adware, rootkits, malicious botnets, social engineering attacks, combinations of one or more of the same, variations of one or more of the same, or any other type or form of malware.

In one example, computing device 202(1) may experience and/or include a potential side-effect 212 of potentially malicious file 210. The term "side-effect," as used herein, generally refers to any type or form of creation of and/or modification to a component of a computing device. For example, potential side-effect 212 may represent and/or include a modification to a file name caused by potentially malicious file 210. Additionally or alternatively, potential side-effect 212 may represent and/or include a modification to a registry key caused by potentially malicious file 210.

In one example, potential side-effect 212 may represent and/or include the creation of a new file caused by potentially malicious file 210. Additionally or alternatively, potential side-effect 212 may represent and/or include the creation of a new registry key caused by potentially malicious file 210.

In some examples, potential side-effect 212 may result from the execution of potentially malicious file 210 on computing device 202(1). Additionally or alternatively, potential side-effect 212 may result from the removal of potentially malicious file 210 from computing device 202(1). Potential side-effect 212 may represent one of many side-effects that result from the execution and/or removal of potentially malicious file 210.

As shown in FIG. 2, computing device 202(N) may be programmed with one or more of modules 102. Additionally and/or alternatively, computing device 202(N) may store and/or include a variant 214 of potentially malicious file 210. The term "variant," as used herein, generally refers to any type or form of script, file, and/or executable that potentially represents and/or includes malware but differs in one way or another from at least one potentially malicious file included in the same family of malware.

In one example, variant 214 may represent and/or include a potentially malicious file included in the same family of malware as potentially malicious file 210. In this example, variant 214 may have a file name that differs from the file name of potentially malicious file 210. Additionally or alternatively, variant 214 may have an attribute that differs from a corresponding attribute of potentially malicious file 210. Examples of variant 214 include, without limitation, computer viruses, computer worms, Trojan horses, spyware, adware, rootkits, malicious botnets, social engineering attacks, combinations of one or more of the same, variations of one or more of the same, or any other type or form of malware.

In one example, computing device 202(N) may experience and/or include a potential side-effect 216 of variant 214. For example, potential side-effect 216 may represent and/or include a modification to a file name caused by variant 214. Additionally or alternatively, potential side-effect 216 may represent and/or include a modification to a registry key caused by variant 214.

In one example, potential side-effect 216 may represent and/or include the creation of a new file caused by variant 214. Additionally or alternatively, potential side-effect 216 may represent and/or include the creation of a new registry key caused by variant 214

In some examples, potential side-effect 216 may result from the execution of variant 214 on computing device 202(N). Additionally or alternatively, potential side-effect 216 may result from the removal of variant 214 from computing device 202(N). Potential side-effect 216 may represent one of many side-effects that result from the execution and/or removal of variant 214.

As shown in FIG. 2, server 206 may be programmed with one or more of modules 102. Additionally or alternatively, server 206 may obtain and/or generate repair script 120. Server 206 may also distribute repair script 120 to one or more of computing devices 202(1)-(N) via network 204.

In one embodiment, one or more of modules 102 from FIG. 1 may, when executed by at least one processor of one or more of computing devices 202(1)-(N) and/or server 206, enable one or more of computing devices 202(1)-(N) and/or server 206 to generate repair scripts that facilitate remediation of malware side-effects. For example, and as will be described in greater detail below, one or more of modules 102 may cause computing device 202(1) and/or server 206 to (1) identify a potentially malicious file located on a computing device 202(1), (2) determine at least one potential side-effect of the potentially malicious file, (3) generate, based at least in part on the potential side-effect of the potentially malicious file, repair script 120 that facilitates remediation of the potential side-effect, and then (4) remedy the potential side-effect by directing computing device 202(1) to execute repair script 120.

Computing devices 202(1)-(N) generally represents any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device capable of generating and/or distributing repair scripts. Examples of server 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing devices 202(1)-(N) and server 206.

Figure 3:
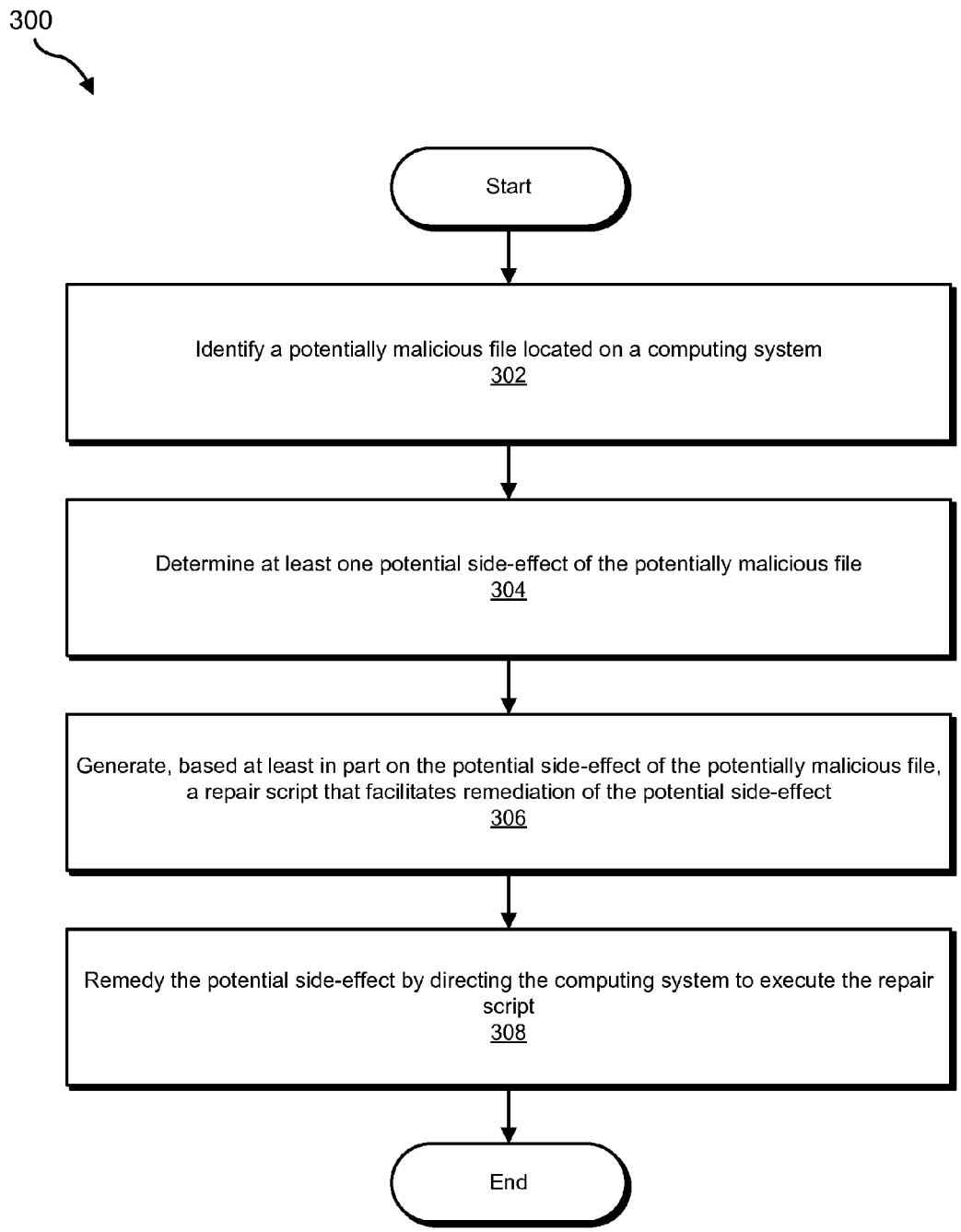
FIG. 3 is a flow diagram of an exemplary method for generating repair scripts that facilitate remediation of malware side-effects.

FIG. 3 is a flow diagram of an exemplary computer-implemented method 300 for generating repair scripts that facilitate remediation of malware side-effects. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a potentially malicious file located on a computing system. For example, at step 302 identification module 104 may, as part of computing device 202(1) and/or server 206 in FIG. 2, identify potentially malicious file 210 located on computing device 202(1). In this example, potentially malicious file 210 may be currently located on computing device 202(1). Additionally or alternatively, potentially malicious file 210 may have been located on computing device 202(1) at an earlier point in time but later removed from computing device 202(1).

The systems described herein may perform step 302 in a variety of ways and/or contexts. In one example, identification module 104 may identify potentially malicious file 210 during a malware and/or remediation scan of computing device 202(1). For example, identification module 104 may scan computing device 202(1) for suspicious files. During this scan, identification module 104 may identify potentially malicious file 210 as a suspicious file. In other words, identification module 104 may determine that potentially malicious file 210 may represent and/or include malware.

Additionally or alternatively, identification module 104 may identify potentially malicious file 210 based at least in part on a log of files that have been removed from computing device 202(1). For example, identification module 104 may locate a log that identifies one or more files removed from computing device 202(1) by an anti-malware technology (such as antivirus software). In this example, identification module 104 may search the log to identify which files were have been removed from computing device 202(1) by the anti-malware technology. During this search, identification module 104 may identify potentially malicious file 210 as having been previously located on but later removed from computing device 202(1).

Returning to FIG. 3, at step 304 one or more of the systems described herein may determine at least one potential side-effect of the potentially malicious file. For example, at step 304 determination module 106 may, as part of computing device 202(1) and/or server 206 in FIG. 2, determine that potential side-effect 212 results from executing and/or removing potentially malicious file 210. In this example, potential side-effect 212 may represent and/or include the creation of a new file and/or a modification to an existing file name. Additionally or alternatively, potential side-effect 212 may represent and/or include the creation of a new registry key and/or a modification to an existing registry key.

The systems described herein may perform step 304 in a variety of ways and/or contexts. In one example, determination module 106 may determine that potential side-effect 212 results from executing and/or removing potentially malicious file 210 by subjecting potentially malicious file 210 to controlled software automation. For example, determination module 106 may subject potentially malicious file 210 to software automation in a controlled automation environment. In this example, the software automation environment may execute potentially malicious file 210. Upon execution of potentially malicious file 210 in the controlled automation environment, determination module 106 may observe and/or record the behaviors exhibited by potentially malicious file 210. By observing and/or recording these behaviors, determination module 106 may be able to gain a fairly accurate understanding as to the side-effects that potentially result from executing and/or removing potentially malicious file 210.

Additionally or alternatively, upon execution of potentially malicious file 210 in the controlled automation environment, determination module 106 may detect evidence of potential side-effect 212. Determination module 106 may then determine that potentially malicious file 210 causes potential side-effect 212 based at least in part on the detected evidence.

In one example, determination module 106 may determine that potential side-effect 212 results from executing and/or removing potentially malicious file 210 based at least in part on field telemetry. For example, determination module 106 may collect behavioral information about potentially malicious file 210 from one or more computing devices 202(1)-(N) that have executed potentially malicious file 210. In this example, the behavioral information may identify certain behaviors exhibited by potentially malicious file 210 on these devices. Determination module 106 may analyze the behavioral information and then identify potential side-effect 212 of potentially malicious file 210 based at least in part on this analysis.

In some examples, determination module 106 may determine at least one potential side-effect of at least one variant of potentially malicious file 210. For example, determination module 106 may subject variant 214 to controlled software automation. Determination module 106 may then determine that variant 214 causes potential side-effect 216 based at least in part on the behaviors exhibited by variant 214 during the controlled software automation.

Additionally or alternatively, determination module 106 may collect behavioral information about variant 214 from one or more of computing devices 202(1)-(N) that have executed variant 214. Determination module 106 may analyze the behavioral information and then identify potential side-effect 216 of variant 214 based at least in part on this analysis.

In some examples, determination module 106 may determine the potential side-effects of all variants of a family of malware. For example, determination module 106 may identify all known variants of a family of malware that includes potentially malicious file 210 and variant 214. In this example, determination module 106 may subject all of these variants to controlled software automation and/or field telemetry. Determination module 106 may then determine all of the potential side-effects that result from executing and/or removing any or all of these variants. In other words, determination module 106 may identify the variations in side-effects observed and/or recorded in connection with any or all of these variants.

In some examples, determination module 106 may determine exact matches of potential side-effects. For example, determination module 106 may determine an exact match of potential side-effect 212. The term "exact match," as used herein, generally refers to any type or form of instance and/or situation in which a potential side-effect is identical to a reference and/or heuristic.

As a specific example, determination module 106 may identify known side-effects 400 in FIG. 4 as potential side-effects of potentially malicious file 210. Additionally or alternatively, determination module 106 may identify known side-effects 400 in FIG. 4 as potential side-effects of the family of malware that includes potentially malicious file 210. As shown in FIG. 4, known side-effects 400 may include files potentially created by potentially malicious file 210 (in this example, "%System%\drivers\TDSServ.sys," "%System%\drivers\H8SRTd.sys," "%System%\TDSS83984.dat," "%System%\TDSS37298.log," and/or "%System%\TDSS48299.dll"), files potentially modified by potentially malicious file 210 (in this example, "ndis.sys," "nvata.sys," "atapi.sys," "advapi32.dll," "idechndr.sys," "vmscsi.sys," and/or "astor.sys"), registry keys potentially created by potentially malicious file 210 (in this example, "HKEY_CURRENT_USER\Software\Mozilla\affid=," "HKEY_CURRENT_USER\Software\Mozilla\subid=," "HKEY_LOCAL_MACHINE\SOFTWARE\H8SRT\ injectors," "HKEY_LOCAL_MACHINE\SOFTWARE\H8SRT," "HKEY_LOCAL_MACHINE\SOFTWARE\TDSS," "HKEY_LOCAL_MACHINE\SYSTEM\CurrentControl Set\Services\H8SRTd.sys," "HKEY_LOCAL_MACHINE\SYSTEM\CurrentControl Set\Services\TDSServ," "HKEY_LOCAL_MACHINE\SYSTEM\CurrentControl Set\Control\SafeBoot\Network\TDSServ.sys," and/or "HKEY_LOCAL_MACHINE\SYSTEM\CurrentControl Set\Control\SafeBoot\Minimal\TDSServ.sys").

Additionally or alternatively, determination module 106 may determine approximate matches of potential side-effects. For example, determination module 106 may determine an approximate match of potential side-effect 212. The term "approximate match," as used herein, generally refers to any type or form of instance and/or situation in which a potential side-effect is approximate and/or substantially similar to a reference and/or heuristic.

Returning to FIG. 3, at step 306 one or more of the systems described herein may generate, based at least in part on the potential side-effect of the potentially malicious file, a repair script that facilitates remediation of the potential side-effect. For example, at step 306 generation module 108 may, as part of computing device 202(1) and/or server 206 in FIG. 2, generate repair script 120 based at least in part on potential side-effect 212 of potentially malicious file 210. In this example, repair script 120 may facilitate remediation of potential side-effect 212.

The systems described herein may perform step 306 in a variety of ways and/or contexts. In some examples, generation module 108 may generate repair script 120 to address potential side-effect 212. For example, generation module 108 may design and/or prepare repair script 120 to facilitate identifying components of computing device 202(1) as side-effects of potentially malicious file 210. In this example, generation module 108 may design and/or prepare repair script 120 such that, upon execution, repair script 120 is able to detect exact and/or approximate matches of certain side-effects.

As a specific example, generation module 108 may generate a generic repair script that identifies each of the components included in known side-effects 400 in FIG. 4. In this example, the generic repair script may identify each of these components as potentially being a side-effect of potentially malicious file 210. This generic repair script may also facilitate identifying variations of these components as potential side-effects based at least in part on one or more heuristics and/or probabilistic thresholds. Accordingly, this generic repair script may facilitate remediation of each of these components and/or their variations.

In one example, generation module 108 may generate repair script 120 based at least in part on potential side-effect 216 of variant 214. In this example, repair script 120 may facilitate remediation of potential side-effect 216. Additionally or alternatively, repair script 120 may facilitate remediation of potential side-effect 212 based at least in part on potential side-effect 216.

In one example, generation module 108 may generate repair script 120 based at least in part on potential side-effect 216 of variant 214. In this example, repair script 120 may facilitate remediation of potential side-effect 216. Additionally or alternatively, repair script 120 may facilitate remediation of potential side-effect 212 based at least in part on potential side-effect 216.

In one example, generation module 108 may generate repair script 120 based at least in part on the potential side-effects of all of the variants of the malware family. In this example, generation module 108 may facilitate remediation of the potential side-effects of all of the variants of the malware family by detecting exact and/or approximate matches of these potential side-effects.

In some examples, repair script 120 may identify a certain threshold used to estimate whether a component of a computing device is likely a malware side-effect. Generation module 108 may compute this threshold in a variety of ways.

In one example, generation module 108 may rely on controlled software automation and/or field telemetry. For example, and as described above, determination module 106 may subject one or more variants of the malware family to controlled software automation. Upon execution of these variants during the controlled software automation, determination module 106 may detect evidence suggesting that a specific component is a side-effect of at least one of these variants. Generation module 108 may then compute a threshold used to estimate whether a similar component is a side-effect of potentially malicious file 210.

Additionally or alternatively, and as described above, determination module 106 may collect behavioral information one or more variants of the malware family from one or more of computing devices 202(1)-(N). Upon analyzing this behavioral information, determination module 106 may identify a specific component as potentially being a side-effect of at least one of these variants. Generation module 108 may then compute a threshold used to estimate whether a similar component is a side-effect of potentially malicious file 210.

Generation module 108 may use any type or form of algorithm to calculate this threshold. Examples of such an algorithm include, without limitation, Lloyd's algorithm, Voronoi interaction, linear regression, the perceptron algorithm, neural networking, regression trees, combinations of one or more of the same, variations of one or more of the same, or any other suitable algorithm. Additionally or alternatively, generation module 108 may use any type or form of analysis tool (such as MALHEUR) to compute the threshold.

Returning to FIG. 3, at step 308 one or more of the systems described herein may remedy the potential side-effect by directing the computing system to execute the repair script. For example, at step 308 remediation module 110 may, as part of computing device 202(1) and/or server 206 in FIG. 2, remedy potential side-effect 212 by directing computing device 202(1) to execute repair script 120. In this example, repair script 120 may facilitate remediation of potential side-effect 212 by returning the corresponding component of computing device 202(1) back to an unadulterated state and/or condition.

The systems described herein may perform step 308 in a variety of ways and/or contexts. In one example, remediation module 110 may remedy potential side-effect 212 by distributing repair script 120 to computing device 202(1). For example, remediation module 110 may direct server 206 to distribute repair script 120 to computing device 202(1) via network 204. Upon receiving repair script 120 from server 206, computing device 202(1) may execute repair script 120 to remedy potential side-effect 212.

In another example, remediation module 110 may remedy potential side-effect 212 upon removal of potentially malicious file 210 from computing device 202(1). For example, remediation module 110 may direct computing device 202 (1) to run repair script 120 once an anti-malware technology (such as antivirus software) has removed potentially malicious file 210 from computing device 202(1). By running repair script 120 in this way, computing device 202(1) may address any lingering side-effects resulting from the execution and/or removal of potentially malicious file 210.

Upon execution, repair script 120 may cause computing device 202(1) to compute a heuristic distance from a known side-effect of potentially malicious file 210 to a component identified as potentially being a side-effect of potentially malicious file 210. The phrase "heuristic distance," as used herein, generally refers to any type or form of value, measurement, and/or metric that represents a certain distance from a known side-effect (or reference point) to a potential side-effect and/or the amount of difference between the known side-effect and potential side-effect.

Figure 5:
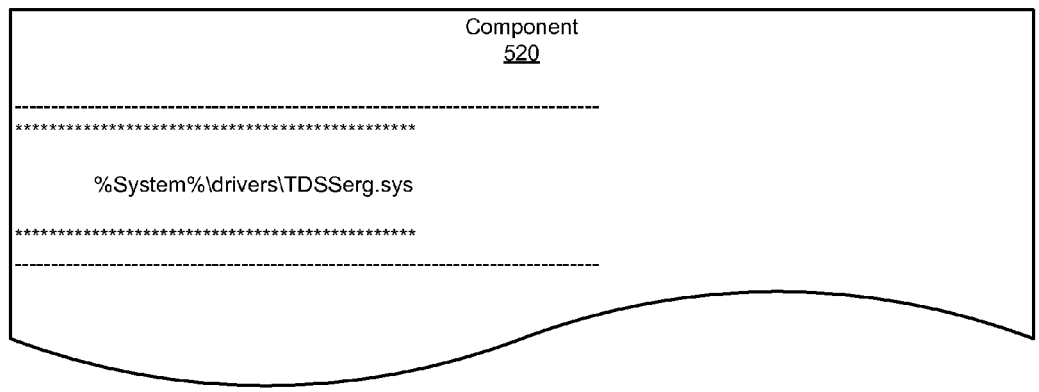
FIG. 5 is an illustration of an exemplary component that is potentially a malware side-effect.
Figure 6:
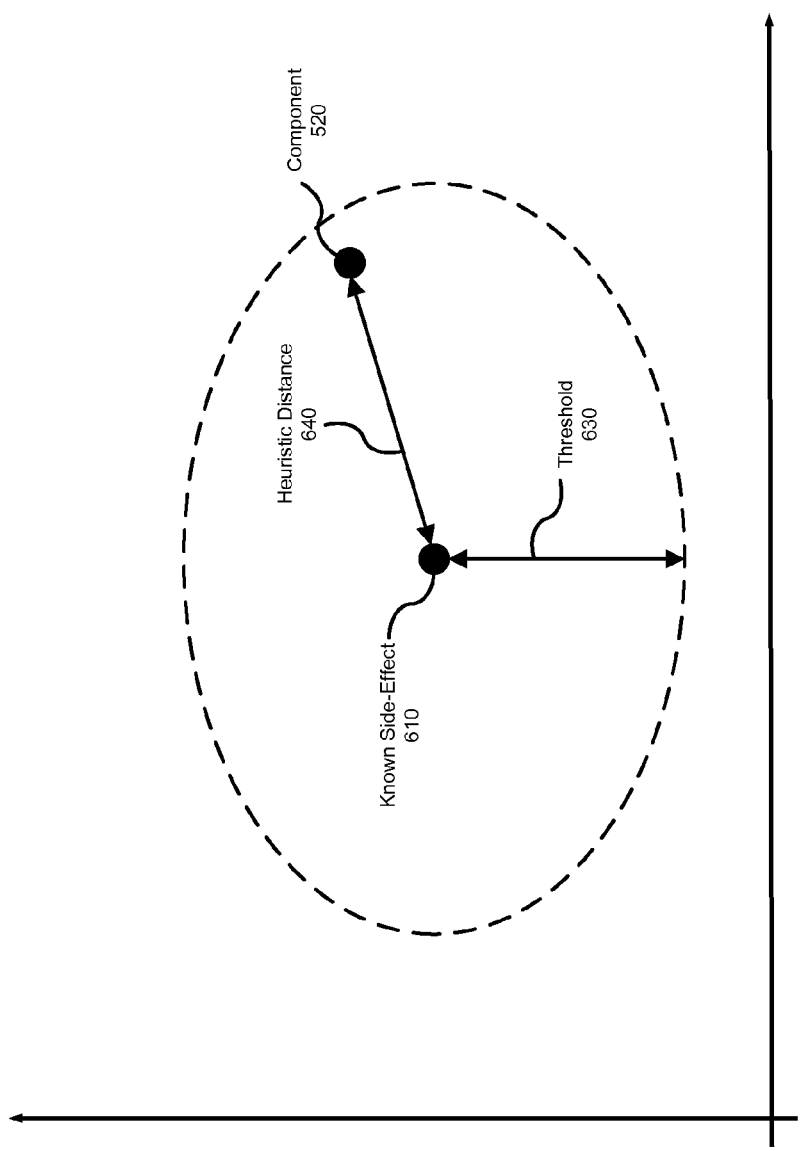
FIG. 6 is an illustration of an exemplary heuristic for estimating whether a component is likely a malware side-effect.

As a specific example, repair script 120 may cause computing device 202(1) to compute a heuristic distance 640 in FIG. 6 from known side-effect 610 in FIG. 6 to an exemplary component 520 in FIGS. 5 and 6. In this example, known side-effect 610 may represent and/or include a file and/or file name "%System%\drivers\TDSServ.sys". As shown in FIG. 5, component 520 may represent and/or include similar file and/or file name (in this example, "%System%\drivers\TDSSerg.sys") located on computing device 202(1). In this example, heuristic distance 640 may represent the distance from the "%System%\drivers\TDSServ.sys" known side-effect to the "%System%\drivers\TDSSerg.sys" component.

Upon computation of heuristic distance 640, repair script 120 may cause computing device 202(1) to determine that heuristic distance 640 is below a certain threshold. For example, repair script 120 may direct computing device 202(1) to compare heuristic distance 640 with threshold 630 in FIG. 6. Computing device 202(1) may then determine that heuristic distance 640 is below threshold 630 based at least in part on this comparison.

Additionally or alternatively, repair script 120 may direct computing device 202(1) to classify component 520 as a side-effect of potentially malicious file 210 in response to the determination that heuristic distance 640 is below threshold 630. Repair script 120 may further direct computing device 202(1) to remedy component 520 due at least in part to its classification as a side-effect of potentially malicious file 210.

In the event that repair script 120 detects an exact match of potential side-effect 212, computing device 202(1) may remedy potential side-effect 212 without any user involvement and/or consent. In the event that repair script 120 detects only an approximate match of potential side-effect 212, computing device 202(1) may query a user of computing device 202(1) on whether to perform the remedy on potential side-effect 212.

Additionally or alternatively, server 206 may collect repair information about certain remedies from one or more of computing devices 202(1)-(N). In the event that the detection of an approximate match leads to improved performance across one or more of computing device 202(1)-(N), generation module 108 may modify repair script 120 to simply remedy potential side-effect 212 without user involvement and/or consent any longer.

In an effort to prevent repair script 120 from incorrectly causing removal of and/or modification to legitimate files and/or registry keys, remediation module 110 may maintain a database that identifies known legitimate files and/or registry keys. In this example, repair script 120 may direct computing device 202(1) to verify that the remedy to be performed on potential-side effect 212 does not result in removal of and/or modification to any of the known legitimate files and/or registry keys maintained in the database.

In the event that potential side-effect 212 represents and/or includes a modification to a file name, repair script 120 may direct computing device 202(1) to returning the file name to its pre-modification state and/or condition. In the event that potential side-effect 212 represents and/or includes a modification to a registry key, repair script 120 may direct computing device 202(1) to returning the registry key to its pre-modification state and/or condition.

In the event that potential side-effect 212 represents and/or includes the creation of a new file, repair script 120 may direct computing device 202(1) to delete the new file from computing device 202(1). In the event that potential side-effect 212 represents and/or includes the creation of a new registry key, repair script 120 may direct computing device 202(1) to delete the new registry key from computing device 202(1).

Figure 7:
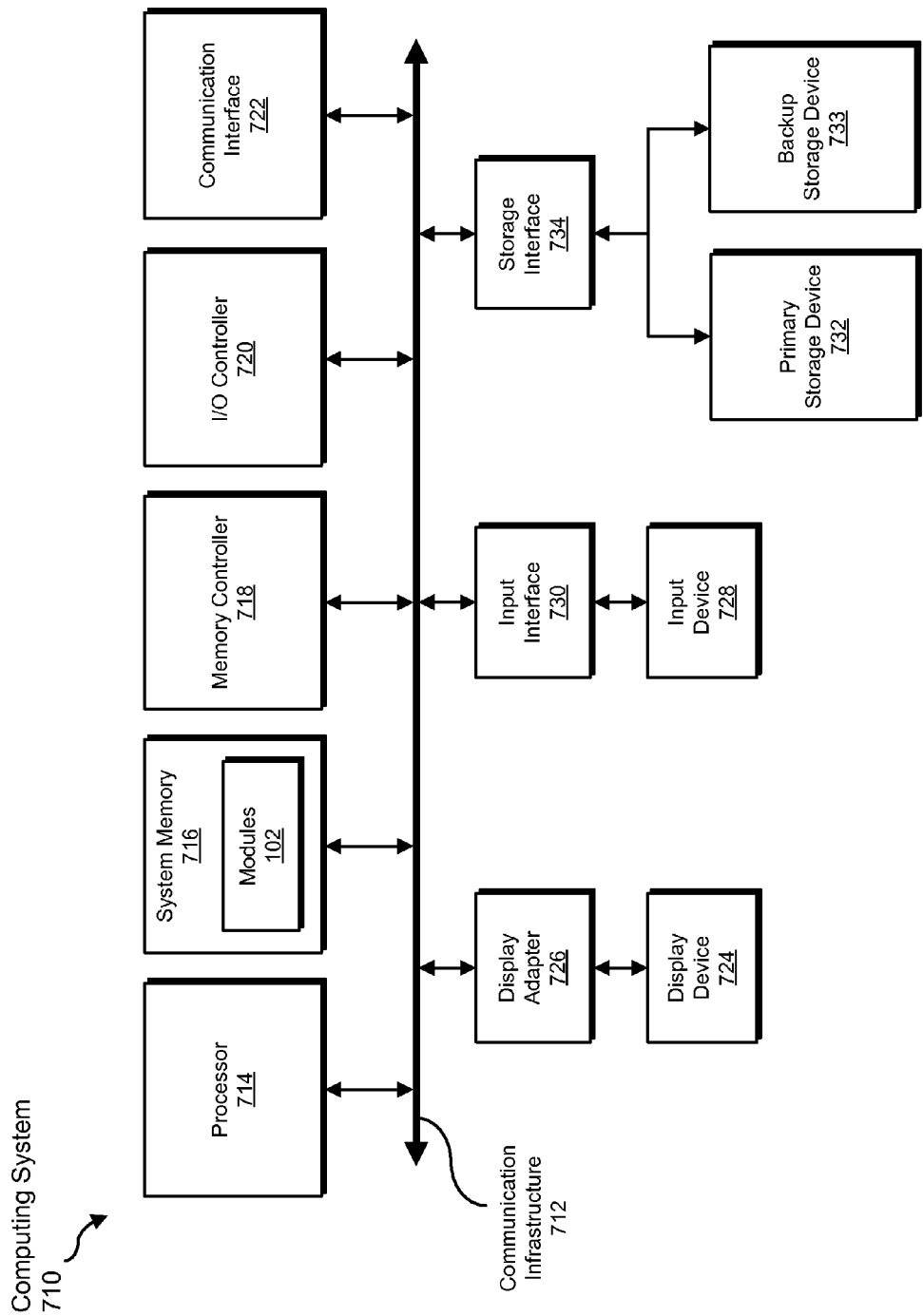
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710.

Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
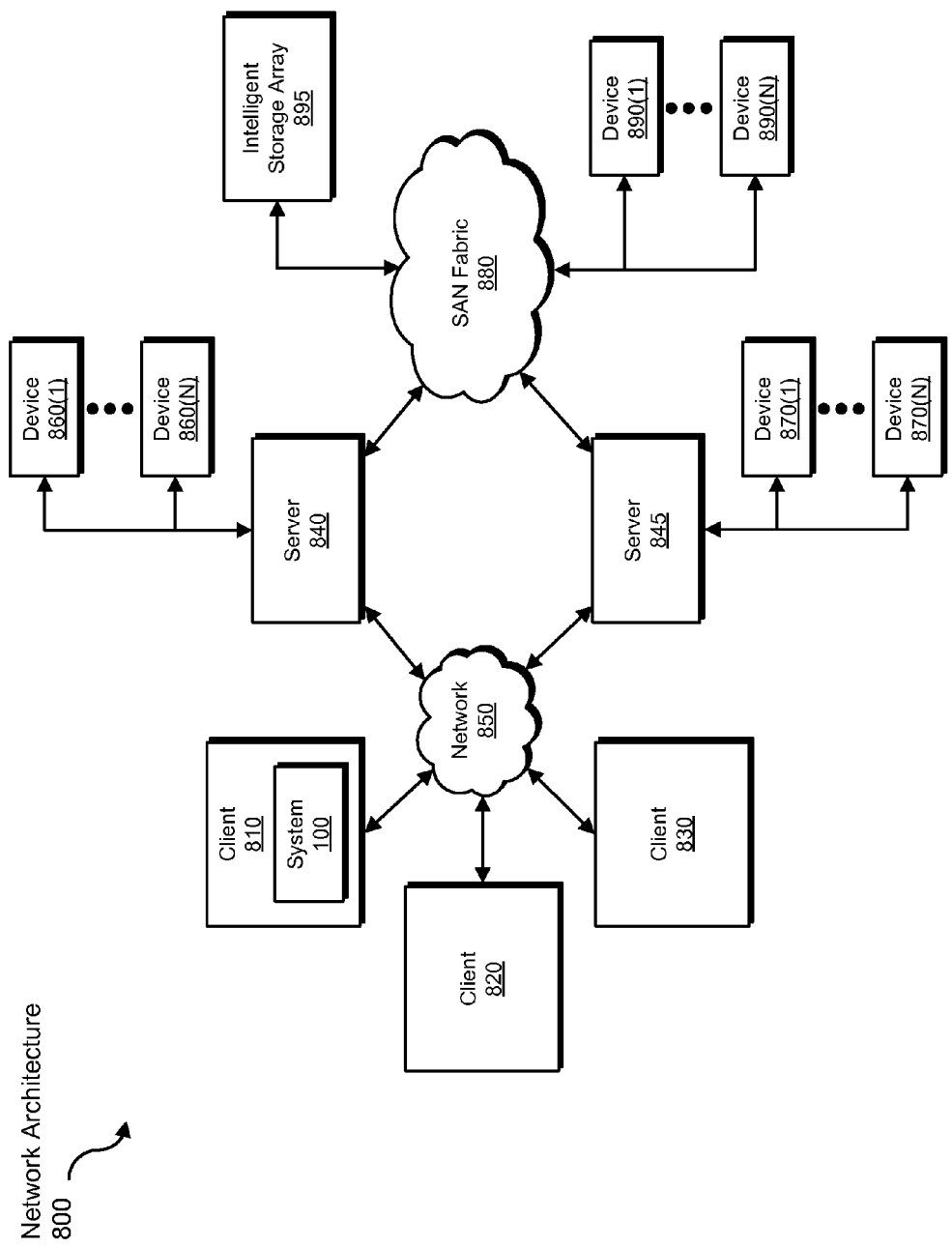
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for generating repair scripts that facilitate remediation of malware side-effects.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive behavioral information to be transformed, transform the behavioral information, output a result of the transformation to generate a repair script, use the result of the transformation to detect malware side-effects using the repair script, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating repair scripts that facilitate remediation of malware side-effects, at least a portion of the method being performed by a computing device comprising at least one processor, the method comprising:

identifying a potentially malicious file located on a computing system;

determining at least one potential side-effect of the potentially malicious file, wherein the potential side-effect represents a registry key or another file that has been created or modified on the computing system by executing or removing the potentially malicious file;

generating, based at least in part on the potential side-effect, a repair script that facilitates remediation of the potential side-effect by:

identifying all known variants of a family of malware that includes the potentially malicious file;

performing a controlled software automation analysis or a field telemetry analysis on all of the known variants of the family of malware; and determining, based at least in part on the controlled software automation analysis or the field telemetry analysis, one or more variations in potential side-effects that result from executing or removing the variants from computing systems; and remedying the potential side-effect by directing the computing system to execute the repair script such that the repair script causes the computing system to:

compute a heuristic distance from a known side-effect of the potentially malicious file to the registry key or the other file that has been created or modified on the computing system by executing or removing the potentially malicious file, wherein the heuristic distance represents an amount of difference between the known-side effect and the potential side-effect;

determine that the heuristic distance from the known side-effect to the registry key or the other file is below a certain threshold;

in response to determining that the heuristic distance is below the certain threshold:

classify the registry key or the other file as a side-effect of the potentially malicious file; and remedy the registry key or the other file due at least in part to the classification as a side-effect of the potentially malicious file.

2. The method of claim 1, wherein the potential side-effect of the potentially malicious file comprises at least one of:

a modification to a file name caused by the potentially malicious file;

a modification to the registry key caused by the potentially malicious file;

a creation of the file caused by the potentially malicious file; and a creation of the registry key caused by the potentially malicious file.

3. The method of claim 1, wherein determining the potential side-effect of the potentially malicious file comprises:

executing the potentially malicious file in a controlled software automation environment;

upon executing the potentially malicious file, detecting evidence of the potential side-effect; and determining, based at least in part on the evidence of the potential side-effect, that the potentially malicious file causes the potential side-effect.

4. The method of claim 1, wherein determining the potential side-effect of the potentially malicious file comprises:

collecting behavioral information about the potentially malicious file from a group of computing devices that have executed the potentially malicious file; and identifying, by analyzing the behavioral information collected from the group of computing devices, the potential side-effect of the potentially malicious file.

5. The method of claim 1, wherein:
determining the potential side-effect of the potentially malicious file comprises determining at least one potential side-effect of at least one variant of the family of malware that includes the potentially malicious file; and
generating the repair script comprises generating, based at least in part on the potential side-effect of the variant, a repair script that facilitates remediation of the potential side-effect of the variant.

6. The method of claim 5, wherein the variant of the family of malware comprises at least one of:
a variant whose file name differs from a file name of the potentially malicious file; and
a variant whose attribute differs from a corresponding attribute of the potentially malicious file.

7. The method of claim 1, wherein generating the repair script that facilitates remediation of the potential side-effect comprises generating a generic repair script that:
identifies the registry key or the other file as potentially being a side-effect of the potentially malicious file; and
facilitates remediation of the registry key or the other file identified as potentially being a side-effect of the potentially malicious file.

8. The method of claim 1, wherein performing a controlled software automation analysis on all of the known variants of the family of malware comprises:
executing at least one variant of the potentially malicious file in a controlled software automation environment;
upon executing the variant of the potentially malicious file, detecting evidence suggesting that the registry key or the other file is a side-effect of the potentially malicious file; and
computing the certain threshold based at least in part on the evidence suggesting that the registry key or the other file is a side-effect of the potentially malicious file.

9. The method of claim 1, wherein performing a field telemetry analysis on all of the known variants of the family of malware comprises:
collecting behavioral information about the potentially malicious file from a group of computing devices that have executed the potentially malicious file;
identifying, by analyzing the behavioral information collected from the group of computing devices, the registry key or the other file as potentially being a side-effect of the potentially malicious file; and
computing the certain threshold based at least in part on the registry key or the other file potentially being a side-effect of the potentially malicious file.

10. The method of claim 1, wherein generating the repair script comprises generating the repair script based at least in part on the variations in potential side-effects that result from executing or removing the variants from computing systems.

11. A system for generating repair scripts that facilitate remediation of malware side-effects, the system comprising:
at least one memory;
an identification module, stored in the memory, that identifies a potentially malicious file located on a computing system;
a determination module, stored in the memory, that determines at least one potential side-effect of the potentially malicious file, wherein the potential side-effect represents a registry key or another file that has been created or modified on the computing system by executing or removing the potentially malicious file;
a generation module, stored in the memory, that generates, based at least in part on the potential side-effect, a repair script that facilitates remediation of the potential side-effect by:
identifying all known variants of a family of malware that includes the potentially malicious file;
performing a controlled software automation analysis or a field telemetry analysis on all of the known variants of the family of malware; and
determining, based at least in part on the controlled software automation analysis or the field telemetry analysis, one or more variations in potential side-effects that result from executing or removing the variants from computing systems;
a remediation module, stored in the memory, that remedies the potential side-effect by directing the computing system to execute the repair script such that the repair script causes the computing system to:
compute a heuristic distance from a known side-effect of the potentially malicious file to the registry key or the other file that has been created or modified on the computing system by executing or removing the potentially malicious file, wherein the heuristic distance represents an amount of difference between the known-side effect and the potential side-effect;
determine that the heuristic distance from the known side-effect to the registry key or the other file is below a certain threshold;
in response to determining that the heuristic distance is below the certain threshold:
classify the registry key or the other file as a side-effect of the potentially malicious file; and
remedy the registry key or the other file due at least in part to the classification as a side-effect of the potentially malicious file; and
at least one physical processor that executes the identification module, the determination module, the generation module, and the remediation module.

12. The system of claim 11, wherein the potential side-effect of the potentially malicious file comprises at least one of:
a modification to a file name caused by the potentially malicious file;
a modification to the registry key caused by the potentially malicious file;
a creation of the file caused by the potentially malicious file; and
a creation of the registry key caused by the potentially malicious file.

13. The system of claim 11, wherein the determination module determines the potential side-effect of the potentially malicious file by:
executing the potentially malicious file in a controlled software automation environment;
upon executing the potentially malicious file, detecting evidence of the potential side-effect; and
determining, based at least in part on the evidence of the potential side-effect, that the potentially malicious file causes the potential side-effect.

14. The system of claim 11, wherein the determination module determines the potential side-effect of the potentially malicious file by:
collecting behavioral information about the potentially malicious file from a group of computing devices that have executed the potentially malicious file; and identifying, by analyzing the behavioral information collected from the group of computing devices, the potential side-effect of the potentially malicious file.

15. The system of claim 11, wherein:
the determination module determines at least one potential side-effect of at least one variant of the family of malware that includes the potentially malicious file; and
the generation module generates, based at least in part on the potential side-effect of the variant, a repair script that facilitates remediation of the potential side-effect of the variant.

16. The system of claim 15, wherein the variant of the family of malware comprises at least one of:
a variant whose file name differs from a file name of the potentially malicious file; and
a variant whose attribute differs from a corresponding attribute of the potentially malicious file.

17. The system of claim 11, wherein the generation module generates a generic repair script that:
identifies the registry key or the other file as potentially being a side-effect of the potentially malicious file; and
facilitates remediation of the registry key or the other file identified as potentially being a side-effect of the potentially malicious file.

18. The system of claim 11, wherein the generation module generates the repair script based at least in part on the variations in potential side-effects that result from executing or removing the variants from computing systems.

19. The system of claim 11, wherein:
the determination module:
collects behavioral information about the potentially malicious file from a group of computing devices that have executed the potentially malicious file; and
identifies, by analyzing the behavioral information collected from the group of computing devices, the registry key or the other file as potentially being a side-effect of the potentially malicious file; and
the generation module may compute the certain threshold based at least in part on the registry key or the other file potentially being a side-effect of the potentially malicious file.

20. A non-transitory computer-readable medium comprising one or more computer-executable instructions that, when executed by at least one processor of a computing device, cause the computing device to:
identify a potentially malicious file located on a computing system;
determine at least one potential side-effect of the potentially malicious file, wherein the potential side-effect represents a registry key or another file that has been created or modified on the computing system by executing or removing the potentially malicious file;
generate, based at least in part on the potential side-effect, a repair script that facilitates remediation of the potential side-effect by:
identifying all known variants of a family of malware that includes the potentially malicious file;
performing a controlled software automation analysis or a field telemetry analysis on all of the known variants of the family of malware; and
determining, based at least in part on the controlled software automation analysis or the field telemetry analysis, one or more variations in potential side-effects that result from executing or removing the variants from computing systems; and
remedy the potential side-effect by directing the computing system to execute the repair script such that the repair script causes the computing system to:
compute a heuristic distance from a known side-effect of the potentially malicious file to the registry key or the other file that has been created or modified on the computing system by executing or removing the potentially malicious file, wherein the heuristic distance represents an amount of difference between the known-side effect and the potential side-effect;
determine that the heuristic distance from the known side-effect to the registry key or the other file is below a certain threshold;
in response to determining that the heuristic distance is below the certain threshold:
classify the registry key or the other file as a side-effect of the potentially malicious file; and
remedy the registry key or the other file due at least in part to the classification as a side-effect of the potentially malicious file.

* * * * *